J. J. SCICLUNA.
AUTOMATIC CATCHING AND SUPPORTING DEVICE.
APPLICATION FILED JULY 21, 1908.

945,053.

Patented Jan. 4, 1910.

2 SHEETS—SHEET 1.

WITNESSES:
Irving A. Tarbox
Estella L. Scicluna

INVENTOR
Joseph J. Scicluna

J. J. SCICLUNA.
AUTOMATIC CATCHING AND SUPPORTING DEVICE.
APPLICATION FILED JULY 21, 1908.
945,053.
Patented Jan. 4, 1910.
2 SHEETS—SHEET 2.
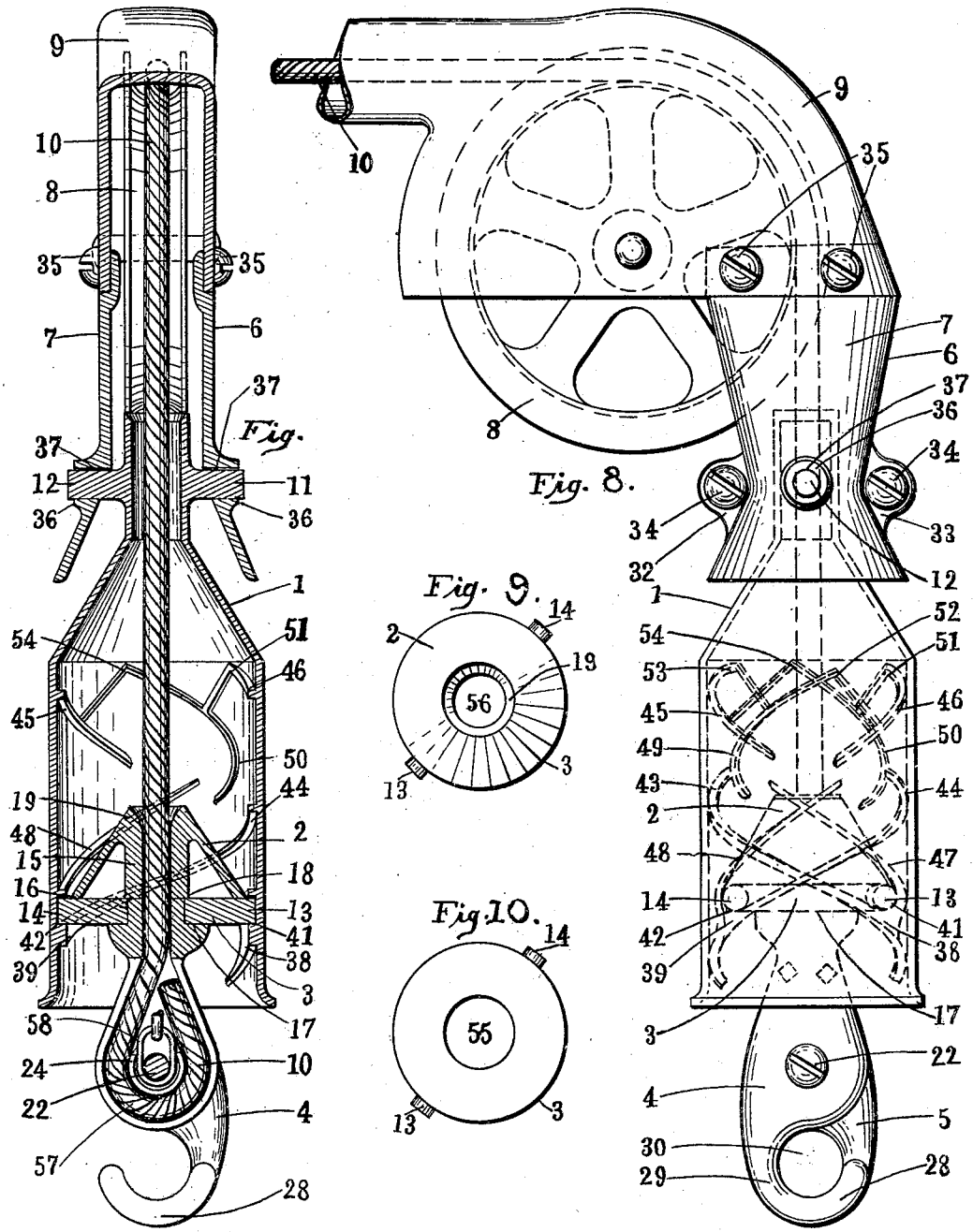
WITNESSES:
Irving A Tarbox
Estella L. Scicluna.
INVENTOR
Joseph J. Scicluna

UNITED STATES PATENT OFFICE.

JOSEPH J. SCICLUNA, OF BUFFALO, NEW YORK.

AUTOMATIC CATCHING AND SUPPORTING DEVICE.

945,053.                Specification of Letters Patent.     Patented Jan. 4, 1910.

Application filed July 21, 1908. Serial No. 444,682.

*To all whom it may concern:*

Be it known that I, JOSEPH J. SCICLUNA, a citizen of the United States, residing at Buffalo, in the county of Erie and State of New York, have invented certain new and useful Improvements in Automatic Catching and Supporting Devices, of which the following is a specification.

My invention relates to improvements in automatic catching and supporting devices and its object is to provide a light, strong and durable automatic support, simple and positive in operation, for the support of lamps, signals, etc. on land and aboard ships.

A further object is to provide means which will allow a rope or chain to be pulled up to a positive stop, the rope or chain being then positively caught, and having a positive catch and release when the operation is repeated.

With these objects in view, my invention consists in the construction and combinations of parts, as hereinafter described and claimed.

Figure 1:
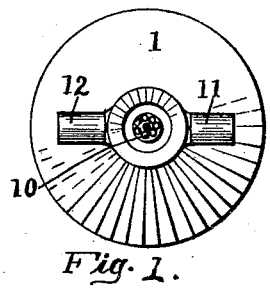
Figure 2:
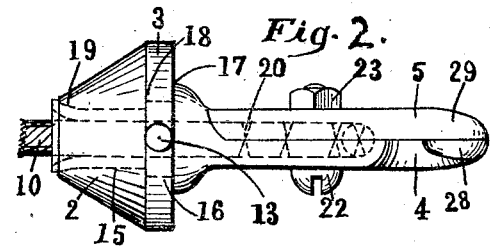
Figure 3:
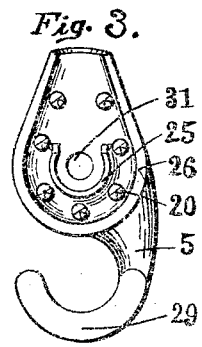
Figure 4:
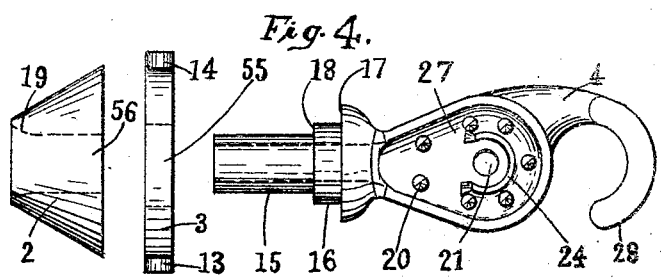
Figure 5:
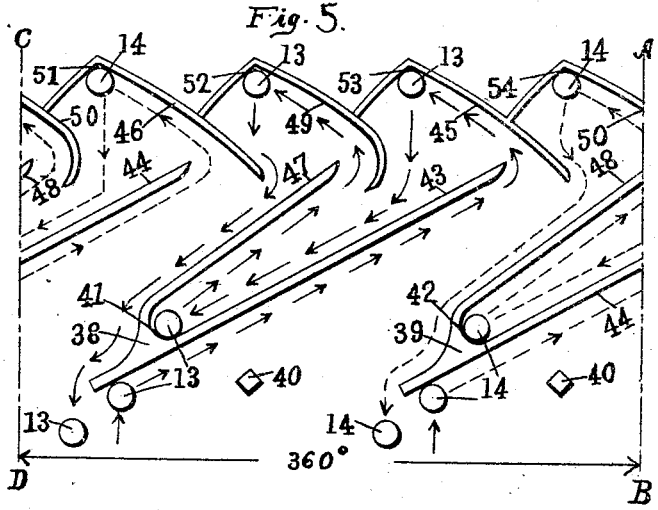
Figure 6:
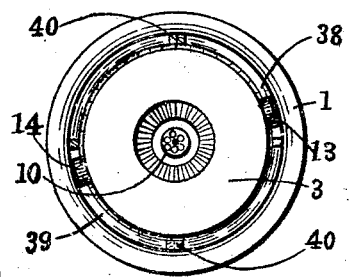

In the accompanying drawings—Figure 1 is a plan view of the catch. Fig. 2 is a side view of the means for gripping the end of a rope or chain. Fig. 3 is a side view of one of the members thereof. Fig. 4 is a side view of the gripping means, the parts being disassembled and one of the parts omitted. Fig. 5 is a view of the cams and guides shown in Fig. 9, developed into a plane. Fig. 6 is a bottom plan view of the parts shown in Fig. 9, the lower parts of the gripping means being omitted. Fig. 7 is a cross section of the complete device, attached to a pulley casing. Fig. 8 is a side view of the same, the cams and guides being shown in dotted lines. Fig. 9 is a top plan view of the swivel coupling, and Fig. 10 is a top plan view of the swivel disk.

1 is a casing, preferably made of metal, in which is supported the rope gripping means. This casing is made in one piece and is tubular, the upper part being of smaller diameter than the lower part and provided with journals 11 and 12. In the inside of the lower part double cams 38 and 39 are provided, the upper parts of each cam being divergent, as shown at 43 and 47 and at 44 and 48, Figs. 5 and 8, leaving pockets 41 and 42. These cams are arranged 180° apart and midway between them are the centering blocks 40. Above these cams, on the inside of the casing, are a series of guides 45, 46, 49 and 50, which terminate in corners or seats 51, 52, 53 and 54, and these guides and corners form a fence to stop the movement of the swivel coupling hereinafter described. These cams and guides are made integral with the casing. This coupling, in its preferred embodiment, consists of a cone 2, perforated as shown at 56, this perforation being countersunk, as shown at 19, a swivel disk 3, perforated as shown at 55 and having journals 13 and 14, and parts on which said cone and disk are mounted.

15 represents a tubular rod enlarged, as shown at 16, forming a shoulder 18, and still further enlarged, forming a shoulder 17. Below the shoulder 17, this part of the coupling is enlarged, forming a channel 27, and is provided with a seat 24 and projections 20. This part of the coupling is provided with a perforation 21, through which passes a bolt 22, provided with a nut 23. The disk 3 is mounted on the part 16 and revolves freely thereon. After the cone 2 is slipped over the part 15, the latter is chamfered outwardly (Fig. 2).

In Fig. 3, the clamp is shown detached. It is symmetrical in shape with the lower part of the coupling, but oppositely arranged. It is provided with a perforation 31, channel 26, a seat 25 and projections 20. This clamp fits against the lower part of the coupling, being secured thereto by the bolt 22 and nut 23, and the lowest part of the clamp and the coupling are made solid and curved, as shown at 28 and 29, forming an eye 30 in which a support for the lamp or signal may be secured.

Referring to Figs. 7 and 8, 10 represents a rope which passes over a pulley 8, which is revolubly mounted in the pulley block 9. 6 and 7 represent a pair of supports for the swivel coupling, which supports are secured to the pulley block by screws 35. These supports are symmetrical with respect to each other and each is composed of a bent metal plate, the plates being secured together by screws 34 passing through ears 32 and 33 on the supports, thus forming a tubular shell, through which the rope 10 passes. The lower part of this shell is flared outwardly and is provided with bearings 36 and 37 for the reception of the journals 11 and 12 of the swivel coupling.

In assembling the device, the rope 10 is passed over the pulley 8 and then passed through the casing 1 and bent around the seat 24, resting on the projections or sharp points 20. The clamp shown in Fig. 3 is then placed against the lower part of the coupling, binding the rope in the position shown in Fig. 7, and the bolt 22 is placed in position and secured by the nut 23. Instead of using a rope, a chain may be used, in which case the end link 58 of the chain, Fig. 7, engages the bolt 22.

The operation is as follows: The parts being in the position shown in Fig. 7, the rope 10 is pulled so as to lift the swivel coupling. This causes the plate 3 to rotate partially, as it rises, the journals 13 and 14 bearing against the parts 47 and 48, the arrows in Fig. 5 showing the movement of the journals 13 and 14. When these journals strike the corners 52 and 54 the upward motion is forcibly stopped. The rope 10 is then loosened and the swivel coupling allowed to fall, by its own weight and the weight of the lamp or signal attached thereto, to the desired point, the journals 13 and 14 being then guided outside the parts 47 and 48, so that the coupling is disengaged from the casing 1. In drawing up the coupling, the journals 13 and 14 are directed into the space between the parts 40 and the cams 38 and 39, and the parts 43 and 44 guide the journals 13 and 14. When these journals 13 and 14 strike the corners 51 and 53, the upward motion is forcibly stopped. The rope is then released and the journals 13 and 14 drop into the pockets 41 and 42, in the original position. I have described the plate 3 as provided with two journals, but one of them may be omitted, if desired.

While I have thus described my invention, I wish it to be distinctly understood that I do not limit myself to the exact details shown and described, as these might be varied widely without departing from the spirit of my invention.

I claim:

1. In an automatic catching and supporting device, the combination of a support, a hollow casing provided with cams and stops on its interior and made integral therewith, and a coupling adapted to support a lamp or signal, said coupling having a freely-movable part provided with a projection adapted to engage said cams and stops, substantially as described.

2. In an automatic catching and supporting device, the combination of a support, a tubular casing carried thereby and having on its interior cams, guides and stops made integral therewith, and a coupling having means to which a lamp or signal may be attached, said coupling including a plate freely movable thereon and provided with journals adapted to engage said cams, guides and stops, substantially as described.

3. In an automatic catching and supporting device, the combination of a support, a tubular casing carried thereby and provided on its interior with stops and with oppositely-arranged cams and guides made integral therewith, a coupling having a disk or plate freely rotatable thereon, and having journals adapted to engage said cams, guides and stops, and flexible suspension means passing through said casing and attached to said coupling, substantially as described.

4. In an automatic catching and supporting device, the combination of a pulley block, a tubular casing supported thereby and having on its interior stops, inclined guides and cams made integral therewith, a coupling adapted to be moved up and down in said casing, said coupling being provided with a plate or disk freely rotatable thereon, and having journals adapted to engage said cams, guides and stops, and a rope passing through said block and casing and secured to said coupling, substantially as described.

5. In an automatic catching and supporting device, the combination of a pulley block, a pulley therein, a tubular casing mounted on said block, said casing having on its interior cams, guides and stops made integral therewith, a movable coupling in said casing, said coupling including a freely-rotatable plate having journals thereon adapted to engage said cams, guides and stops, and a rope passing over said pulley and secured to said coupling, said coupling being provided with means for clamping the ends of said rope, substantially as described.

6. In an automatic catching and supporting device, the combination of a pulley block, a tubular guide member secured thereto, a tubular casing pivotally mounted in said member, said casing being provided on its interior with cams, guides and stops made integral therewith, a coupling adapted to be moved up and down in said casing, said coupling having a plate freely rotatable and provided with journals adapted to engage said cams, guides and stops, and a rope passing through said block member and casing and secured to said coupling, said coupling being provided with means for clamping the end of said rope, substantially as described.

7. In an automatic catching and supporting device, the combination of a pulley block, a pulley therein, a tubular member secured to said block, a tubular casing pivotally supported by said member, said casing being provided with internal cams, guides and stops made integral therewith, and a rope passing over said pulley and through said block member and casing and secured to said coupling, said coupling having means for clamping one end of said rope and having an eye to which a lamp or signal may be secured, substantially as described.

8. In an automatic catching and supporting device, a tubular casing open at both ends and largest at the bottom and having on its interior oppositely-arranged cams and inclined guides made integral therewith some of said guides terminating in corners and also provided with centering blocks, substantially as described.

9. In an automatic catching and supporting device, a coupling composed of an upper tubular portion, a conical part mounted on said tubular portion, a plate revolubly mounted on said portion beneath the conical portion and having projecting journals, and a lower portion composed of two symmetrical parts bolted together, each of said parts having on its interior projections and a seat, and said parts terminating in oppositely-arranged curved solid portions forming an eye, substantially as described.

In testimony whereof I have signed my name to this specification in the presence of two subscribing witnesses.

JOSEPH J. SCICLUNA.

Witnesses:
 IRVING A. TARBOX,
 ESTELLA L. SCICLUNA.